No. 853,691. PATENTED MAY 14, 1907.
A. GURNEY.
LOCKING COVER FOR COOKING UTENSILS, &c.
APPLICATION FILED MAR. 28, 1906.
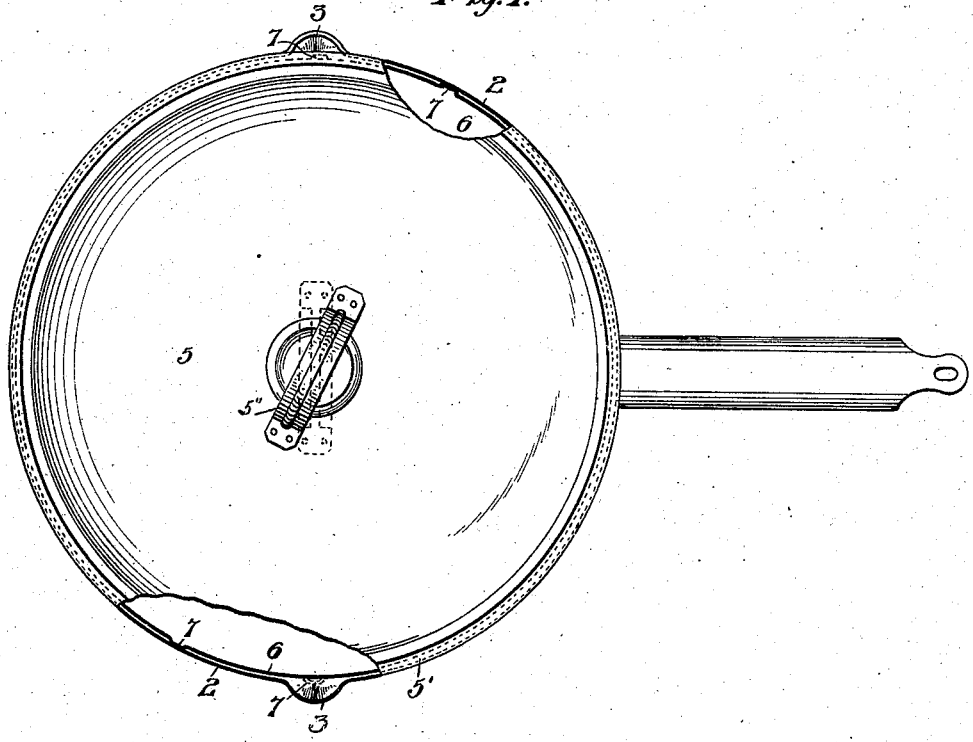
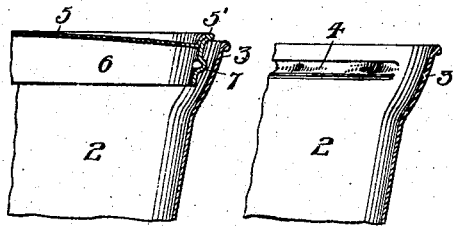
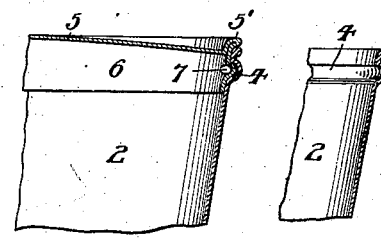
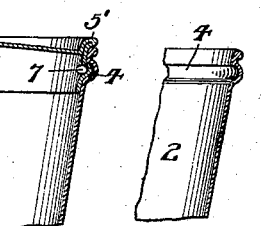
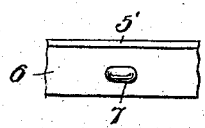
Witnesses:
Inventor
Amelia Gurney

UNITED STATES PATENT OFFICE.

AMELIA GURNEY, OF PITTSBURG, PENNSYLVANIA, ASSIGNOR TO WILLIAM SYLVESTER, OF PITTSBURG, PENNSYLVANIA.

LOCKING-COVER FOR COOKING UTENSILS, &c.

No. 853,691.   Specification of Letters Patent.   Patented May 14, 1907.

Application filed March 28, 1906. Serial No. 308,597.

*To all whom it may concern:*

Be it known that I, AMELIA GURNEY, a citizen of the United States, residing at Pittsburg, in the county of Allegheny and State of Pennsylvania, have invented certain new and useful Improvements in Locking-Covers for Cooking Utensils, &c., of which the following is a specification, reference being had therein to the accompanying drawings.

This invention relates to covered vessels, particularly to covered cooking utensils, and the object is to provide means for securing the cover so that it will remain in place when the pan or vessel is tipped, as when draining juice or water from fruit or vegetables, the locked cover retaining the latter within the vessel.

In applying the invention to a stew pan, I provide a pan with pouring spouts or bulges, and form the top edge of the pan with a groove or bead which intersects the spouts. The flange of the cover has a snug fit within the top of the pan, and this flange is provided with opposite projections which enter the spout-enlargements when applying the cover, and then by turning the cover the projections are moved into the groove or bead and the cover securely locked.

In the accompanying drawing, I have shown a stew pan constructed in accordance with the invention, Figure 1 being a top plan view, partly in section. Figs. 2 to 6 are detail views.

Referring to the drawing, 2 designates the body of the pan and 3 the outwardly bulged spouts at opposite sides thereof. Just beneath the top edge of the pan is the outward bulge or bead 4 which intersects spouts 3. 5 is the cover, 5' the outer edge thereof, and 6 the depending circular flange which snugly fits within the top of the pan and is formed with the opposite outward bulges 7 which enter the spouts when placing the cover on the pan. Thus, the bulges do not interfere with the cover becoming firmly seated, and then upon turning the cover by means of its handle 5", bulges 7 are carried around into bead or groove 4, and the cover is securely locked. The pan may then be tipped and the liquid poured therefrom without emptying the solid contents.

While the invention is designed primarily for cooking utensils, it may be applied to various other receptacles without departing from the invention.

I claim:—

1. A circular cooking vessel having its upper portion and upper edge interrupted by two outwardly bulged spouts, the side wall of the vessel having lateral bulges or grooves intersecting the spouts above their lower ends a cover having a vessel-entering flange of less depth than the spouts, whereby the spouts are not closed by the flange when the cover is in place, and outward projections on the cover-flange adapted to enter the spouts and pass into the lateral bulges or grooves when the cover is turned.

2. A circular cooking vessel formed at its top edge with outwardly bulged pouring spouts and a circumferential groove or outward bulge above the lower ends of the spouts and continuous around the vessel excepting where interrupted by the spouts, a cover for the vessel having a flange of less depth than the spouts, and outward projections on the cover-flange adapted to enter the spouts and move into the said groove when the cover is turned, the cover being thus freely movable and secured at all times excepting when the flange projections intersect the spouts.

In testimony whereof I affix my signature in presence of two witnesses.

AMELIA GURNEY.

Witnesses:
J. M. NESBIT,
MARGARET HUGHES.